United States Patent [19]

Smith

[11] 4,340,414

[45] Jul. 20, 1982

[54] PLANT HIBERNATION

[76] Inventor: Walton J. Smith, Rte. 4, Grafton, N.H. 03240

[21] Appl. No.: 118,304

[22] Filed: Feb. 4, 1980

Related U.S. Application Data

[63] Continuation of Ser. No. 904,889, May 11, 1978, abandoned.

[51] Int. Cl.³ ............................. C05C 5/02; C05C 5/04
[52] U.S. Cl. ........................................ 71/59; 71/64.10; 71/36; 71/50; 71/51
[58] Field of Search ................... 71/58, 59, 50, 61, 36, 71/51, 64.8, 64.9, 64.10, 64.11

[56] References Cited

U.S. PATENT DOCUMENTS 1,916,617  7/1933  Jaenecke et al. ...................... 71/58

*Primary Examiner*—S. Leon Bashore, Jr.
*Assistant Examiner*—Ferris H. Lander
*Attorney, Agent, or Firm*—Larson and Taylor

[57] ABSTRACT

A plant nutrient solution has been found for bringing about hibernation of plants consisting of approximately 3 grams of calcium nitrate and 2 grams of potassium nitrate per gallon of water, said solution containing no more than trace quantities of phosphate.

1 Claim, No Drawings

PLANT HIBERNATION

This is a continuation, of application Ser. No. 904,889 filed May 11, 1978 and now abandoned.

This invention pertains to processes for altering the growth of plants and the resulting plants. It pertains primarily to plants grown indoors at least in the early stages of the plant's life.

The hobby of growing plants indoors at least in the early stages of the plant's life is gaining in popularity. Once one has mastered the ability to maintain a healthy houseplant for an extended period, one's interest usually expands and there is no limit to the extent of the desires of many hobbyists.

At this point the plants themselves often become the limiting factor, rather than the ability of the hobbyist. I will give some examples of this. If one wishes to grow some plants indoors which normally grow to a large size outdoors, frustration results. Many herbs, for instance, grow quite large outdoors and do not lead themselves to indoor gardening. Perhaps dill would be a good example of this. Even tomatoes can present some problems in indoor gardening, particularly if one does not have much room. There are dozens and dozens of plants which, if they could be made to grow in a miniature fashion, would be of considerable interest to the hobbyist.

Consider also the differences in the problems of the hobbyist in warm climates like Florida as compared to those in northern climates like Vermont and Maine. The seasons in the northern climates are shorter, at least, the growing season outdoors. Plants that may be planted in May in the South often can only be planted in June in New Hampshire. This necessitates planting seeds indoors and caring for the plants indoors until they can be transplanted outdoors later. Unfortunately many of these plants, such as tomatoes, require considerable room and light, further depressing the interest of many hobbyists.

It is not only the hobbyist who finds himself limited severely in what he may accomplish indoors, but also the professional nurseryman. Take tomatoes for instance. In order to have a saleable product, he must start the plants early and have them rather well grown before these can be marketed. A tomato plant which bears fruit, for example in 130 days after planting the seed indoors, will have to have had two to three months growth if the purchaser wishes to have it bear considerable fruit in the growing season in the north. The professional grows these plants in the greenhouse, which is heated at considerable expense. He is limited by the number of square feet in the greenhouse in the quantity of seedlings he can produce.

I have attempted to overcome these obstacles, and the degree to which I have been successful is the subject of this patent application. So that my discoveries may be better understood, I shall first summarize what can now be accomplished by my invention which previously was not even visualized in the prior art:

1. I have been able in many instances to bring about a state of "hibernation" in certain plantlets in the early stages of their growth with the following benefits:
   a. For a period of days and weeks, the plantlet can be prevented from increasing in size, yet many of its processes are maturing thus requiring fewer square feet for the production of large numbers of plants;
   b. At the desired time, generally within a limited time period, the hibernated plantlet may be induced by proper nutrition to begin a rapid growing phase. Thus, when the purchaser acquires the plantlet, he may have all the advantages of a semimature plant at lower cost and higher convenience.
   c. The transporting of the hibernating plantlets, such as shipping my mail, may be accomplished at much lower cost because less soil is required and less water during shipment, and of course the plantlet is much smaller requiring a smaller carton.
   d. There are other advantages involving light and temperature requirement during the hibernation phase. Hibernating tomato plants for example may be stored for much of their hibernation period in the dark at fairly high temperatures and humidities taking some of the space load from the greenhouse.

2. I have been able in instances to slow the growth of developing plantlets for several days and weeks, and then nourish them to maturity in such a way that they are in effect miniature forms of the plant which the seed from which they came would normally produce. This permits the hobbyist to produce plants for indoors which normally only would be of interest for outdoor gardening.

While I have been very successful at accomplishing the above in several varieties of plants, the plant kingdom is immense and it is not within the scope of this specification to explore how my discoveries may be applied to all plants, nor even to some extent to ascertain in highly quantitative manner all the variations in nutrients which may be utilized in practicing my invention.

At one extreme of my discovery is the finding that many plants grown from seed in distilled water on a non-nutrient support medium, so that the plantlet has available all the water it needs to stay alive, after a substantial period of time (but before the plant dies) upon feeding of a complete nutrient formula will then grow and flourish. The resulting plant will often mature at about the same rate and time as a sister plant which had the complete nutrient formula all the time, yet the plant which had been deprived will not attain the same height as its sister plant.

When grown in distilled water, as the plantlet develops, it will have a deficiency of certain nutrients, the leaves will become etiolated and eventually will die, and eventually the plant will die. While it is not totally impractical to use this "distilled water method" to achieve some of the objectives of this invention, I have made substantial improvements on top of this discovery.

I have discovered that many plants may be brought to a state of hibernation in a nutrient medium which is totally adequate in several necessary nutrients, yet devoid of one or more necessary nutrients. At one extreme of my invention is the development of a "hibernated" plant by growing the seedling in a medium devoid of one "essential nutrient" generally from seed for a period of about four to eight weeks prior to adding a "complete" growth medium. At the other extreme is the growing for the same period, the seedling in essentially distilled water.

For the purposes of my invention, as a general rule, it is assumed that the seed being planted has most or all essential nutrients to germinate and grow for a short period in distilled water. As a practical matter I have found that "trace elements" are present in the seed in adequate amounts during most of the hibernation period (about 4–8 weeks). Thus, for purposes of describing this invention, I have defined "essential nutrients" as calcium, potassium, and magnesium among the cations; sulfate and phosphate among the anions, and a nitrogen source such as nitrate, ammonium ion, urea, and water.

An object of this invention is to supply one or more but not all of the "essential nutrients" during the "hibernation" period, followed by breaking the hibernation by supplying phosphate or the missing element, and then supplying the seedlings a complete formula or a well-balanced soil. My basic medium for producing hibernation is usually a mixture of potassium and calcium nitrates, however, depending on the specific application other essential nutrients may be included. As an example, with tomato seedlings, magnesium sulfate can be included without losing some of the benefits of "hibernation". It has been noted that in these nutrient systems, phosphate is a limiting factor to growth, and when it is added, even in the absence of magnesium sulfate, considerable growth occurs.

"Trace elements" are those elements more or less essential to further good growth beyond the hibernation breaking period. The "hibernation period" is the period as previously described in which the plantlets are being fed a nutrient medium in which growth is essentially stopped without killing the plant. The hibernation is broken by feeding the plant a more complete nutrient medium with or without trace elements. My invention then consists of growing plants in three successive time periods:

(1) germination and hibernation period,
(2) hibernation breaking period,
(3) final development period.

The first period is usually 4–12 weeks, with 4–8 weeks being preferred; the hibernation breaking period is 1–7 days, and the final development period depends on the plant.

This invention is accomplished by means of two phases (1) a liquid phase, and a (2) a "support medium" phase. The above three periods usually employ both phases. In the hibernation breaking period and the final development period, soil and other solid nutrient support media may be utilized.

Although the seeds can be started in distilled water on filter paper, as a practical matter for the professional nursery man, growing a plant in pure, distilled water alone is not practical since it is necessary to have a support medium. I have discovered that vermiculite usually does not have enough adequate nutrients to support the growth of most plants and makes an excellent support medium in the application of my invention. When I grow plants such as wheat (and a wide variety of other plants) on vermiculite and water devoid of nutrients, the seedling develops and grows fairly normally for awhile, eventually the upper part loses its chlorophyll and dies. While vermiculite by itself is not adequate for the maturing of most plants, it has no major deficiencies for the accomplishment of this invention.

While it is by no means the only procedure, I allow seeds to germinate on vermiculite generally wetted with distilled water, and after they have germinated and are forming root systems, I plant them in small pots on vermiculite and then continue to develop the plant through the three periods as discussed thoroughly in this specification.

I have discovered that for many plants such as tomato, I can wet the growing medium (vermiculite) with distilled water containing calcium nitrate and potassium nitrate. These two nutrients provide a tiny bit of nutrition for the plantlets, but generally not enough to permit the plantlets to grow to maturity. This is not to say that in a seed, nature has never provided enough total nutrition for the plant to mature, but as a general rule, seeds simply do not have enough total nutrition in them to carry them much beyond germination and enough growth to get them into the light. Obviously small seeds are far more dependent on outside nutrition than larger ones. This is true for tomato seeds, which are small.

When tomato plants are grown from seed in the manner described above, the plantlets grow to an inch or so depending upon the type of seed, and it is noted that after a period, the leaves, in fact the entire plant, turns almost a dark black. I have grown some tomato plants supported by vermiculite for a period of over sixty days (from seed) on vermiculite with nothing but the above nutrient medium, yet they remain in a state of hibernation and do not die.

For purposes of this invention, I have defined "hibernation" as a state within the plant in which essentially no growth occurs, yet a degree of ageing occurs. The conditions of the hibernation are such that mutations may occur within the plant developing a new species upon receiving a complete nutrient. Mature plants grown from hibernated plants have some characteristics which differ from the seedlings grown in a normal manner on complete nutrient media from germination onward.

One has the impression that the plant is "hibernating" yet one sees little sign that the plant is dying, though the longer the plantlet hibernates with the deprived nutrient medium, the more likely it is to lose some of its primary leaves, and of course there is a limit to the length of a useful hibernation period. The parallel with hibernating bears is interesting in that even the period of hibernation is limited to several weeks.

After a month or six weeks in this hibernated state, if one then waters the tomato plant with a "complete" nutrient medium, one sees a change in the plant often in as short a period as 1 or 2 days. Instead of the "black" foliage, one sees tinges of light green in the leaves. The growth weight increases rapidly after the hibernation has been broken, and growth proliferates. Within a week or two the plant appears to be perfectly normal, though smaller than it would have been if it had not been hibernating. As the tomato plant matures, flowers form, and many of these become tomatoes which are quite normal and tasty. The resultant mature plants are often shorter than sister plants grown from seed with complete nutrient media from the start. This could be an advantage when growing tomato plants which normally would be too large, for example, for indoor gardening, yet which produce larger tomatoes than normal miniature tomato plants.

The hibernated tomato plant, which, depending upon type, can be an inch or two high, and because it is not really growing at any visible rate, requires very little space, thereby permitting a nursery to produce many more saleable plants in the same growing space. It also permits starting plants earlier in the nursery making more efficient use of the winter period.

There are a wide variety of tomato plants, ranging from large to small, within a wide variety of tomatoes including different shapes and colors. Most nurserymen grow only one or a few types. For the home gardner who has the desire for a specific type not available in his local nursery, he usually must grow the tomato plants himself. One of the results of my invention is that these tiny hibernated plants may be shipped easily and cheaply, partly because of their size, and partly because of their reduced metabolism. A hibernated tomato plant can weigh as little as a gram, and often an additional gram or two of wet vermiculite adhering to the roots is adequate to maintain the plant for a week's trip in the mails. Although the hibernated plants may be shipped as is, there are some advantages in "breaking" the hibernation with a more complete formula prior to shipment.

I have taken a hibernated tomato plant which was about seven weeks old and watered it with a complete nutrient solution until it had about doubled its weight. I cut it off at the top of the growing medium and dried it in an oven. When I compared the water content with a sister hibernated plant, I found that the moisture content was substantially higher in the non-hibernating plant. There was about 87% water in the hibernating plantlet and 92% water in the sister plant of the same age.

As described above, the hibernated tomato plants after they have been fed a complete nutrient for a period of time grow rapidly and eventually more or less catch up, at least in maturity but not necessarily in size, with their sister plants which have had continuous sources of complete nutrients. They flower and the flowers develop into normal tomatoes.

Some house plants are grown for their flowers. I have planted Balsam seeds in normal fashion but in distilled water eventually changing to the calcium-potassium nitrate mixture as their source of nutrition. The plantlets do grow but remain very small compared to their sisters grown in complete nutrient media. While the plantlets are not quite as dark as their tomato counterparts, they are darker than normal balsam plantlets. After about four to six weeks or even longer, the plantlets are then fed complete nutrient solutions and they, almost overnight, change their appearances, and develop into rapidly growing plants. Under identical light conditions as their sisters, who have been receiving continuous complete minerals, they grow much smaller yet they flower about the same time, and while the flowers are a little smaller, they are very adequate and look like camelias. If the flower pot contains several seeds, a bouquet of beautiful multicolored flowers can be achieved.

Distilled water may be used in making up solutions for bringing about hibernation, or the water may be deionized. I measure the conductance of the water used for this purpose, and I have found that I can use water which has a conductance as high as 30 micromhos. Also I have used water with a conductance as high as 300 micromhos for shorter periods after the plant is hibernated and prior to breaking the hibernation, however, such waters should be very low in phosphate or preferably free of phosphate.

The following list of "complete" nutrients is illustrative of successful ranges which can be used for practicing this invention (most ingredients are hydrates) (given in grams per gallon):

|  | Range | Preferred |
| --- | --- | --- |
| Calcium Nitrate | 1-5 | 3 |
| Potassium Nitrate | 1-4 | 2 |
| DiK and K DiH Phosphates | 0.2-0.8 | 0.5 |
| Epsom Salts | 0.4-1.2 | 0.8 |

As stated earlier, to bring about hibernation, the phosphate moiety should usually be eliminated from the growth medium.

Vermiculite is a good support medium, however, other media may be used as long as they do not provide a source of complete nutrients and especially phosphorus.

I have used analytical grade reagents in this work, however, these were not free of impurities, and calcium nitrate as an example, contained traces of magnesium. Potassium nitrate contained up to 0.0005% phosphate. USP Epsom Salts were used successfully as one of the ingredients to produce and maintain hibernation.

While it was not necessary to add trace elements ("non-essential" by the definition of "essential") to break the hibernation, ferric nitrate, boric acid, and manganese sulfate were used with the essential ingredients in tap water for eventual development of mature plants. Tap water in my experiments had a conductance of approximately 300 micromhos.

Example 1. Pixie Tomato seeds were planted on vermiculite wetted with distilled water. After germinating they were transplanted in vermiculite to small pots, and the vermiculite was wetted as required with a solution containing 3 grams of calcium nitrate hydrate and 2 grams of potassium nitrate per gallon of distilled water. After about three weeks, the plants showed a decrease in the rate of growth and the leaves darkened. Watering with the nutrient medium was continued for eight weeks from the date of planting the seeds. A complete nutrient medium containing all the nutrients shown in the previous table was then used. The hibernation was broken in one to two days, and the plants then resumed growth and tripled their size soon and were repotted with soil. The plants matured producing normal tomatoes, however, the plants were smaller than their sister counterparts grown from start on complete nutrient media.

Example 2. Patio tomato seeds were used instead of "Pixie" in Example 1.

Example 3. Using the procedure in Example 1, balsam seeds were planted and allowed to hibernate. After two months, the hibernation was broken and the procedure in example 1 was followed producing small plants with beautiful normal flowers. Parallel growth of seeds from the same lot of seeds with a complete medium for the entire period produced somewhat larger plants flowering at about the same time.

Example 4. Example 1 was repeated with geranium seeds. In this particular study, the hibernated plantlets did not darken in the same way as tomato plantlets, however, the plants were "hibernated" since growth was essentially stopped during the hibernation period, and the hibernation could be broken as in Example 1.

Example 5. Sweet pepper seeds were used instead of tomato seeds in Example 1 with similar results, however, the plantlets did not turn black as was true with balsam and tomato even though pepper is from the same family as tomato.

Example 6. Hibernated tomato plants were covered to prevent moisture loss and stored for one week in a dark incubator at 80° F., then brought out from the incubator to room temperature permitting the plantlets to adjust gradually to the humidity change, the hibernation was then broken with a complete nutrient. The plantlets grew and normalized as if they had not been stored in the dark. The plantlets did not become etiolated nor elongated as would have happened to non-hibernated plants. This experiment demonstrates in a further way the nature of these hibernated plants.

The hibernated plants may be stored in reduced light, in which case "reduced light" refers to light intensity lower than would normally be required for normal growth without undesired stem elongation and etiolation. This method permits a tremendously greater number of plants to be grown in the same space as well as to enable the production of a larger number of plants for sale at any specific time.

I claim:

1. A plant nutrient solution for bringing about hibernation of plants consisting of approximately 3 grams of calcium nitrate and 2 grams of potassium nitrate per gallon of water, said solution containing no more than trace quantities of phosphate.

* * * * *